(12) United States Patent
Shi et al.

(10) Patent No.: US 11,564,226 B2
(45) Date of Patent: Jan. 24, 2023

(54) RESOURCE INDICATION METHOD AND APPARATUS AND COMPUTER STORAGE MEDIUM

(71) Applicant: GUANGDONG OPPO MOBILE TELECOMMUNICATIONS CORP., LTD., Guangdong (CN)

(72) Inventors: Zhihua Shi, Guangdong (CN); Zhi Zhang, Guangdong (CN); Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 197 days.

(21) Appl. No.: 17/009,678

(22) Filed: Sep. 1, 2020

(65) Prior Publication Data
US 2020/0404645 A1 Dec. 24, 2020

Related U.S. Application Data

(63) Continuation of application No. PCT/CN2018/081644, filed on Apr. 2, 2018.

(51) Int. Cl.
*H04W 72/04* (2009.01)
*H04L 5/00* (2006.01)
*H04W 48/12* (2009.01)

(52) U.S. Cl.
CPC ......... *H04W 72/048* (2013.01); *H04L 5/0055* (2013.01); *H04W 48/12* (2013.01); *H04W 72/042* (2013.01)

(58) Field of Classification Search
CPC . H04W 72/048; H04W 48/12; H04W 72/042; H04L 5/0055
See application file for complete search history.

(56) References Cited

U.S. PATENT DOCUMENTS 8,743,720 B2 6/2014 Lee
9,144,106 B2 9/2015 Lee
(Continued)

FOREIGN PATENT DOCUMENTS

CN 102781111 A 11/2012
CN 103428876 A 12/2013
(Continued)

OTHER PUBLICATIONS

English translation of the Written Opinion of the International Search Authority in the international application No. PCT/CN2018/081644, dated Jan. 4, 2019.
(Continued)

*Primary Examiner* — Michael J Moore, Jr.
(74) *Attorney, Agent, or Firm* — Perkins Coie LLP

(57) ABSTRACT

A resource indication method and apparatus and a computer storage medium are provided. The method includes that: a terminal device receives first indication information from a network device, the first indication information indicating an active transmission resource and/or an inactive transmission resource; and based on the first indication information, the terminal device detects a downlink control channel on the active transmission resource and/or does not detect a downlink control channel on the inactive transmission resource.

20 Claims, 3 Drawing Sheets

A terminal device receives first indication information from a network device, the first indication information indicating an active transmission resource and/or an inactive transmission resource — 101

The terminal device detects a DL control channel on the active transmission resource and/or does not detect the DL control channel on the inactive transmission resource based on the first indication information — 102

(56) References Cited

U.S. PATENT DOCUMENTS

| | | |
|---|---|---|
| 9,161,384 B2 | 10/2015 | Lee et al. |
| 9,565,662 B2 | 2/2017 | Lee et al. |
| 9,622,221 B2 | 4/2017 | Lee et al. |
| 9,629,095 B2 | 4/2017 | Dinan |
| 9,992,700 B2 | 6/2018 | Dinan |
| 2012/0039200 A1 | 2/2012 | Lee |
| 2013/0230009 A1 | 9/2013 | Lee |
| 2014/0050188 A1 | 2/2014 | Park |
| 2014/0140309 A1 | 5/2014 | Lee |
| 2015/0359037 A1 | 12/2015 | Lee et al. |
| 2016/0014755 A1 | 1/2016 | Lee et al. |
| 2016/0286495 A1 | 9/2016 | Dinan |
| 2017/0223566 A1 | 8/2017 | Dinan |
| 2018/0279157 A1 | 9/2018 | Dinan |
| 2019/0053318 A1* | 2/2019 | Nogami ............... H04L 5/0044 |
| 2019/0207662 A1* | 7/2019 | Zhou .................... H04L 5/0048 |
| 2019/0253308 A1* | 8/2019 | Huang .................. H04W 72/10 |
| 2020/0213978 A1* | 7/2020 | Iyer ....................... H04L 5/0078 |
| 2020/0229154 A1* | 7/2020 | Takeda .................... H04L 27/26 |
| 2020/0280337 A1* | 9/2020 | Yi .......................... H04L 1/1861 |
| 2020/0374845 A1* | 11/2020 | Tang ..................... H04L 5/0053 |
| 2020/0404645 A1* | 12/2020 | Shi ........................ H04W 48/12 |
| 2021/0007101 A1* | 1/2021 | Tooher ............. H04W 56/0015 |
| 2021/0076445 A1* | 3/2021 | Tsai ....................... H04L 5/003 |
| 2021/0084620 A1* | 3/2021 | Tooher .............. H04W 72/0446 |
| 2021/0167930 A1* | 6/2021 | Jeon .................... H04L 27/2607 |
| 2022/0030568 A1* | 1/2022 | Behravan ............ H04L 41/0803 |
| 2022/0263631 A1* | 8/2022 | Horiuchi ............... H04L 5/0094 |

FOREIGN PATENT DOCUMENTS

| | | |
|---|---|---|
| CN | 103857041 A | 6/2014 |
| CN | 103973418 A | 8/2014 |
| CN | 104244295 A | 12/2014 |
| JP | 2013524613 A | 6/2013 |
| JP | 2016529745 A | 9/2016 |
| WO | 2017173038 A1 | 10/2017 |
| WO | 2018174271 A1 | 9/2018 |

OTHER PUBLICATIONS

Supplementary European Search Report in the European application No. 18913784.7, dated Feb. 16, 2021.
International Search Report in the international application No. PCT/CN2018/081644, dated Jan. 4, 2019.
First Office Action of the European application No. 18913784.7, dated Dec. 2, 2021. 8 pages.
First Office Action of the Indian application No. 202017045928, dated Dec. 3, 2021. 6 pages with English translation.
First Office Action of the Japanese application No. 2020-547196, dated Feb. 4, 2022. 8 pages with English translation.
Second Office Action of the European application No. 18913784.7, dated May 18, 2022. 5 pages.
First Office Action of the Chinese application No. 202110789966.8, dated Sep. 27, 2022. 19 pages with English translation.
Third Office Action of the European application No. 18913784.7, dated Oct. 25, 2022. 7 pages.

* cited by examiner

RESOURCE INDICATION METHOD AND APPARATUS AND COMPUTER STORAGE MEDIUM

CROSS-REFERENCE TO RELATED APPLICATION

This application is a continuation of International Patent Application No. PCT/CN2018/081644 filed on Apr. 2, 2018, the entire content of which is incorporated herein by reference for all purposes.

TECHNICAL FIELD

The disclosure relates to the technical field of wireless communication, and particularly to a resource indication method and apparatus and a computer storage medium.

BACKGROUND

In a New Radio (NR) system, a network may configure a Control Resource Set (CORESET) and a search space (SS). Each CORESET may include time-frequency resources (for example, specific frequency-domain resources that are to be occupied and the number of continuous time-domain symbols that are to be occupied) and some other configurations.

In an NR design, both a CORESET and an SS are configured by radio resource control (RRC) configuration. User equipment (UE), after receiving an SS configuration, may detect a Physical downlink Control Channel (PDCCH) according to the SS configuration. Such a design is flexible to some extent but is not flexible enough in some cases.

According to a present mechanism, the abovementioned configuration needs to be changed by RRC configuration. RRC configuration has a relatively large latency, which is usually dozens to hundreds of milliseconds or more.

SUMMARY

The embodiments of the disclosure provide a method for resource indication, which may include that:

a terminal device receives first indication information from a network device, the first indication information indicating an active transmission resource and/or an inactive transmission resource; and the terminal device detects a downlink (DL) control channel on the active transmission resource and/or refrains from detecting the DL control channel on the inactive transmission resource based on the first indication information.

The embodiments of the disclosure provide an apparatus for resource indication, which may include a transmission device and a processor connected to the transmission device.

The transmission device may be configured to receive first indication information from a network device, the first indication information indicating an active transmission resource and/or an inactive transmission resource.

The processor may be configured to detect a DL control channel on the active transmission resource and/or refrain from detect the DL control channel on the inactive transmission resource based on the first indication information.

BRIEF DESCRIPTION OF THE DRAWINGS

The drawings described herein are adopted to provide a further understanding to the disclosure and form a part of the application. Schematic embodiments of the disclosure and descriptions thereof are adopted to explain the disclosure and not intended to form improper limits to the disclosure. In the drawings.

DETAILED DESCRIPTION

Figure 1:
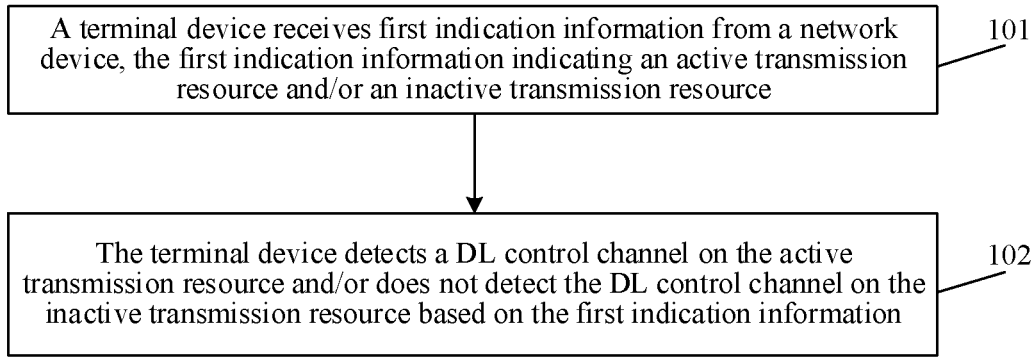
FIG. 1 is a first flowchart of a resource indication method according to an embodiment of the disclosure.

For making the technical solutions of the embodiments of the disclosure convenient to be understood, related technologies involved in the embodiments of the disclosure will be described below.

In an NR system, a network may configure one or more CORESETs, and furthermore, the network may configure one or more SSs, each SS being associated with a CORESET. In an NR design, both a CORESET and an SS are configured by RRC configuration. UE, after receiving an SS configuration, may detect a PDCCH according to the SS configuration. Such a design is flexible to some extent but is not flexible enough in some cases, specifically as follows.

1) A data service usually has certain abruptness. When a burst occurs, transmission is preferred to be completed rapidly. In such case, UE may detect a PDCCH according to a shorter period and thus can perform more transmissions in short time. If no data packet arrives in case of expiration, the UE may detect the PDCCH according to a longer period, thereby reducing the power consumption.

2) When the UE is in a Single-User Multiple-Input Multiple-Output (SU-MIMO) network, the network may enable the UE to detect a simple DCI format (for example, a DCI format 1_0) only and thus the power consumption can be reduced. If another user needs to be paired with the UE to use Multi-User Multiple-Input Multiple-Output (MU-MIMO) or if multiple Transmission Reception Points (TRPs) are to implement transmission for the UE in the future, the network may enable the UE to detect more DCI formats (for example, a DCI format 1_1) for improving the performance, and these formats may provide more function configurations, so that the network performance can be improved. It is to be understood that the example is for a DL DCI format.

3) When the UE gradually gets far away from a base station, for ensuring the coverage, the network needs to transmit information in a high aggregation level (a low aggregation level may fail to ensure the receiving performance. In such case, the UE does not need to detect possible PDCCH candidates in the low aggregation level). On the contrary, if the UE gets close to the base station, the network only needs to transmit information in the low aggregation level to ensure the receiving performance of the UE.

According to a present mechanism, change of all the above-mentioned configuration needs to be made by RRC configuration. The RRC configuration involves a relatively large latency that usually requires dozens to hundreds of milliseconds or more. Therefore, for the exemplary scenarios above, a more flexible changing mechanism is introduced, so that the flexibility can be further improved, and the power consumption of the UE can be lowered.

Meanings of activation and deactivation involved in the following embodiments will be described as follows from the angle of UE.

Activation of a transmission resource: the UE detects a DL control channel on a corresponding transmission resource.

A resource in an active state: the UE detects a DL control channel on a corresponding transmission resource.

Deactivation of a transmission resource: the UE does not need to or refrains from detecting the DL control channel on a corresponding transmission resource.

A resource in an inactive state: the UE does not need to or refrains from detecting a DL control channel on a corresponding transmission resource.

FIG. 1 is a first flowchart of a resource indication method according to an embodiment of the disclosure. As shown in FIG. 1, the resource indication method includes the following operations.

In operation 101, a terminal device receives first indication information from a network device, the first indication information indicating an active transmission resource and/or an inactive transmission resource.

In the embodiment of the disclosure, the transmission resource may be a resource configured for the terminal device to monitor a DL control channel, for example, an SS.

In an implementation mode, the terminal device, after receiving the first indication information from the network device, may send an acknowledgement message indicating that the first indication information is successfully received to the network device.

In an implementation mode, the terminal device may send indication information indicative of a transmission resource expected to be activated and/or indication information indicative of a transmission resource expected to be deactivated to the network device for reference, so that the network device can give an appropriate instruction to the terminal device.

In an implementation mode, the first indication information may be DCI or a MAC CE. Furthermore, under the condition that the first indication information is the DCI, 1) the DCI may be UE-specific DCI, or, the DCI may be group-common DCI; and 2) the DCI may be scrambled by a C-RNTI, or, the DCI may be scrambled by a dedicated RNTI, or, the DCI may be scrambled by a specific RNTI. Herein, the dedicated RNTI refers to an existing dedicated RNTI, for example, a Configured Scheduling RNTI (CS-RNTI), a Semi-Persistent Channel State Information RNTI (SP-CSI-RNTI) and a Transmit Power Control Sounding Reference Signal RNTI (TPC-SRS-RNTI). The specific RNTI refers to a new dedicated RNTI.

In operation 102, the terminal device detects a DL control channel on the active transmission resource and/or does not detect the DL control channel on the inactive transmission resource based on the first indication information.

In the embodiments of the disclosure, the terminal device may receive first configuration information from the network device, the first configuration information being configured to configure N transmission resources or select N transmission resources from a group of transmission resources, N≥2 and N being an integer. In an implementation mode, the first configuration information may be DCI, or SI, or RMSI or a MAC CE.

In the embodiments of the disclosure, the terminal device may determine the active and/or inactive transmission resource based on the first indication information in the following implementation manners.

A first manner is that: the first indication information includes indication information of M1 transmission resources, M1 being a positive integer (1≤M1≤N), and a first transmission resource is one of the M1 transmission resources; responsive to that the first transmission resource is in an active state before the first indication information is received, the first transmission resource may get deactivated after the first indication information is received; and/or, responsive to that the first transmission resource is in an inactive state before the first indication information is received, the first transmission resource may get activated after the first indication information is received.

In an example, the transmission resource may be an SS. The first indication information includes indication information of an SS1, indication information of an SS2 and indication information of an SS3. An original state of the SS1 is an active state, an original state of the SS2 is an inactive state and an original state of the SS3 is an inactive state. After the first indication information is received, a present state of the SS1 is changed to an inactive state, a present state of the SS2 is changed to an active state and a present state of the SS3 is changed to an active state.

In the embodiments of the disclosure, the indication information of the transmission resource may be implemented in the following manners.

1) The transmission resource corresponds to a label; and the first indication information includes indication information of labels corresponding to the M1 transmission resources respectively. Or, 2) The transmission resource corresponds to K-bit information, K being a positive integer; and the first indication information includes K-bit information corresponding to the M1 transmission resources. In an example, 00 corresponds to the SS1, 01 corresponds to the SS2, and 10 corresponds to the SS3.

A second manner is that: the first indication information includes indication information of M1 transmission resources and activation indication information or deactivation indication information corresponding to the M1 transmission resources, M1 being a positive integer (1≤M1≤N), and the first transmission resource is one of the M1 transmission resources; responsive to that the first transmission resource corresponds to activation indication information, the first transmission resource is activated or the first transmission resource is kept in an active state; and/or, responsive to that the first transmission resource corresponds to deactivation indication information, the first transmission resource is deactivated or the first transmission resource is kept in an inactive state.

In an example, the transmission resource may be an SS. The first indication information includes indication information and activation indication information of an SS1, indication information and deactivation indication information of an SS2 and indication information and activation indication information of an SS3. In such case, if an original state of the SS1 is an active state, a present state of the SS1 is kept to be an active state; and if the original state of the SS1 is an inactive state, the present state of the SS1 is changed to an active state. The same manner can be applied to the SS2 and the SS3.

In the embodiments of the disclosure, the indication information and corresponding activation indication information or deactivation indication information of the transmission resource may be implemented in the following manner.

The transmission resource corresponds to K-bit information, K being a positive integer, and the activation indication information or the deactivation indication information corresponds to I-bit information; and the first indication information includes L-bit information corresponding to the M1 transmission resources respectively, K-bit information among the L-bit information represents the indication information of the transmission resource and I-bit information among the L-bit information represents the activation indication information or deactivation indication information corresponding to the transmission resource, $1 \leq I \leq L-K$ and I being an integer.

In an example, the transmission resource may be indicated by 2-bit information, 00 corresponds to the SS1, 01 corresponds to the SS2 and 10 corresponds to the SS3. Activation or deactivation may be indicated by 1-bit information, 0 represents deactivation and 1 represents activation. In such case, 001 represents activation of the SS1, 010 corresponds to deactivation of the SS2, 100 corresponds to deactivation of the SS3.

In the embodiments of the disclosure, each transmission resource may correspond to one piece of activation indication information or deactivation indication information, or, multiple transmission resources correspond to one piece of activation indication information or deactivation indication information.

A third manner is that: the first indication information includes indication information of M1 transmission resources, M1 being a positive integer ($1 \leq M1 \leq N$), and the first transmission resource is one of the M1 transmission resources; and the first transmission resource is activated or the first transmission resource is kept in an active state, or the first transmission resource is deactivated or the first transmission resource is kept in an inactive state.

In the embodiments of the disclosure, the first indication information may be divided into two types, one type indicating activation and the other type indicating deactivation.

In an example, the transmission resource may be an SS. The first indication information for activation/deactivation includes indication information of an SS1, indication information of an SS2 and indication information of an SS3. After the first indication information is received, all the SS1, the SS2 and the SS3 are in an active/inactive state.

In the embodiments of the disclosure, the indication information of the transmission resource may be implemented in the following manners:

1) The transmission resource corresponds to a label; and the first indication information includes indication information of labels corresponding to the M1 transmission resources respectively. Or, 2) The transmission resource corresponds to K-bit information, K being a positive integer; and the first indication information includes K-bit information corresponding to the M1 transmission resources. In an example, 00 corresponds to the SS1, 01 corresponds to the SS2, and 10 corresponds to the SS3.

A fourth manner is that: the first indication information includes first bitmap information, the first bitmap information is represented by M2 bits, M2≥N and M2 being an integer, N bits among the M2 bits correspond to the N transmission resources one to one, and the first transmission resource is one of the N transmission resources; when a value of a bit corresponding to the first transmission resource is a first numerical value, the first transmission resource is activated or the first transmission resource is kept in an active state; and/or, when a value of a bit corresponding to the first transmission resource is a second numerical value, the first transmission resource is deactivated or the first transmission resource is kept in an inactive state.

In an implementation mode, a corresponding relationship between the N bits among the M2 bits and the N transmission resources may be determined by at least one of: a rule specified in a protocol, RRC configuration, and indication by a MAC CE.

In an example, the first bitmap information may be represented by five bits in the DCI. When the number of configured SSs is three, the first three bits or last three bits of the five bits correspond to the three SSs respectively. A value of each bit represents that the corresponding SS needs to be activated or deactivated. As shown in Table 1, a corresponding relationship between the three bits and the three SSs is as follows.

TABLE 1

| Bit | Corresponding relationship |
|---|---|
| First bit | SS1 |
| Second bit | SS2 |
| Third bit | SS3 |

In an example, when the value corresponding to the three bits in the DCI are 001, it is indicated that the SS1 and the SS2 are deactivated and the SS3 is activated (there is made such a hypothesis that 0 represents deactivation and 1 represents activation. Their meanings can be exchanged).

A fifth manner is that: the first indication information includes first bitmap information, the first bitmap information is represented by M2 bits, M2≥N and M2 being an integer, N bits among the M2 bits correspond to the N transmission resources one to one, and the first transmission resource is one of the N transmission resources; when a value of a bit corresponding to the first transmission resource is a first numerical value, the present active state of the first transmission resource is changed to an inactive state or the present inactive state of the first transmission resource is changed to an active state; and/or, when a value of a bit corresponding to the first transmission resource is the second numerical value, the present active state of the first transmission resource is kept unchanged or the present inactive state of the first transmission resource is kept unchanged.

In an implementation mode, a corresponding relationship between the N bits among the M2 bits and the N transmission resources may be determined by at least one of: a rule specified in a protocol, RRC configuration, and indication by a MAC CE.

In an example, the first bitmap information may be represented by three bits in the DCI. When the number of configured SSs is two, the first two bits or last two bits of the three bits correspond to the two SSs respectively. A value of each bit represents whether the active state/inactive state of the corresponding SS needs to be changed or is kept unchanged. As shown in Table 2, a corresponding relationship between the two bits and the two SSs is as follows.

TABLE 2

| Bit | Corresponding relationship |
|---|---|
| First bit | SS1 |
| Second bit | SS2 |

In an example, when values corresponding to the two bits in the DCI are 01, it is indicated that the state of the SS1 is kept unchanged (namely the SS1, if originally being activated, is kept activated now and, if originally being not activated, is kept deactivated) and the state of the SS2 is changed (namely the SS1, if originally being activated, is deactivated now and, if originally being not activated, is activated now). In this example, there is made such a hypothesis that 0 represents that the state is kept unchanged and 1 represents that the state is changed. Their meanings may also be exchanged.

Figure 2:
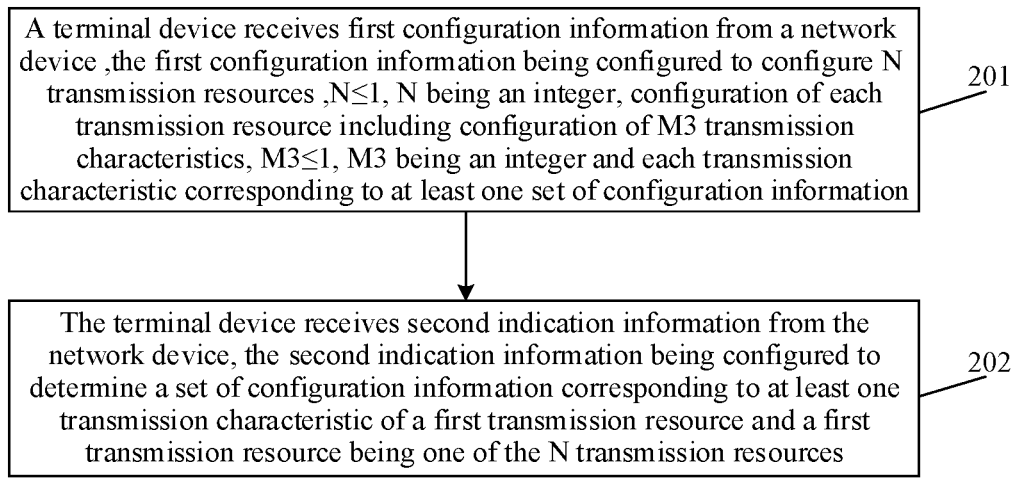
FIG. 2 is a second flowchart of a resource indication method according to an embodiment of the disclosure.

FIG. 2 is a second flowchart of a resource indication method according to an embodiment of the disclosure. As shown in FIG. 2, the resource indication method includes the following operations.

In operation 201, a terminal device receives first configuration information from a network device, the first configuration information being configured to configure N transmission resources, N being an integer, configuration of each transmission resource including configuration of M3 transmission characteristics, M31, M3 being an integer and each transmission characteristic corresponding to at least one set of configuration information.

In the embodiments of the disclosure, the transmission resource may be a resource configured for the terminal device to monitor a DL control channel, for example, an SS.

In an implementation mode, the first configuration information may be DCI, or SI, or RMSI or a MAC CE.

In an example, the transmission resource may be an SS. Configuration of each SS may include configuration of the following five transmission characteristics:
  configuration of an SS identifier;
  configuration of a DCI format;
  configuration about a PDCCH candidate in an aggregation level;
  configuration of a period; and
  configuration of detection in a time-domain resource range (for example, configuration of specific symbols where a PDCCH needs to be detected in a time slot).

Configuration of the DCI format may include one or more sets of configuration information. Configuration of the PDCCH candidate may also include one or more sets of configuration information. Configuration of the period may also include one or more sets of configuration information. Configuration of detection in a time-domain resource range may also include one or more sets of configuration information.

Configuration of each SS is not limited to the above and may include configuration of more or fewer transmission characteristics.

In operation 202, the terminal device receives second indication information from the network device, the second indication information being configured to determine a set of configuration information corresponding to at least one transmission characteristic of a first transmission resource and the first transmission resource being one of the N transmission resources.

In an implementation mode, the terminal device, after receiving the second indication information from the network device, may send an acknowledgement message indicating that the second indication information is successfully received to the network device.

In an implementation mode, the terminal device may send an expected set of configuration information corresponding to the at least one transmission characteristic of the first transmission resource to the network device for reference, so that the network device can give an appropriate instruction to the terminal device.

In an implementation mode, the first indication information may be DCI or a MAC CE. Furthermore, when the first indication information is the DCI,
  1) the DCI is UE-specific DCI, or, the DCI is group-common DCI; and
  2) the DCI is scrambled by a C-RNTI, or, the DCI is scrambled by a dedicated RNTI, or, the DCI is scrambled by a specific RNTI. Herein, the dedicated RNTI refers to an existing dedicated RNTI such as a CS-RNTI, an SP-CSI-RNTI and a TPC-SRS-RNTI; and the specific RNTI refers to a new dedicated RNTI.

In the embodiments of the disclosure, the second indication information is configured to determine the set of configuration information corresponding to the at least one transmission characteristic of the first transmission resource, which may be implemented in the following manners.

A first manner is that: the second indication information includes indication information of the at least one transmission characteristic and indication information of the set of configuration information corresponding to the at least one transmission resource respectively.

In an example, two sets of configuration information may be configured for DCI formats for SS1: the first set is {DCI format 1_0} and the second set is {DCI format 1_0, DCI format 1_1}. In such case, the specific set to be used and configured for the DCI formats for the SS1 can be indicated to UE through the DCI. In an example, an indication form of the DCI is as follows:
  SS1 0/1 (0 represents the first set and 1 represents the second set).

If two transmission characteristics correspond to two sets of different configurations for SS2 respectively, the specific corresponding characteristics may be directly indicated by bits in the DCI. In an example, the indication form of the DCI is as follows:
  SS2 characteristic 1 0/1 (0 represents the first set and 1 represents the second set), and
  SS2 characteristic 2 0/1 (0 represents the first set and 1 represents the second set).

A second manner is that: the second indication information includes the indication information of the set of configuration information corresponding to the at least one transmission characteristic respectively, and a transmission characteristic corresponding to a set of configuration information is determined based on a position of the set of configuration information in the second indication information.

In this manner, the specific characteristic that is indicated is implicitly determined (for example, a corresponding relationship is determined according to the configuration and a position sequence in the DCI). There is made such a hypothesis that two transmission characteristics correspond to two sets of different configurations in SS2 respectively, configuration information corresponding to the two transmission characteristics respectively are represented by two bits, the first bit corresponding to the characteristic 1 and the second bit corresponding to the characteristic 2. If 0 represents the first set and 1 represents the second set, 01 represents that the first set of configuration information is adopted for the characteristic 1 and the second set of configuration information is adopted for the characteristic 2.

The technical solution of the embodiments of the disclosure may be applied to multiple scenarios, for example, the following scenarios.

1) During daily transmission, for reducing the power consumption of UE, a network configures different SSs for the UE.

When the UE is busy, some SSs or a certain SS may be activated and/or some other SSs or another SS may be deactivated; and when the UE is not busy, some SSs or a SS may be deactivated and/or some other SSs or another SS may be activated.

When a system is busy and a scheduling opportunity of UE is reduced, some SSs or a SS may be deactivated and/or some other SSs or another SS may be activated; and when a system load is low and there are many scheduling opportunities for the UE, some SSs or a SS may be activated and/or some other SSs or another SS may be deactivated.

2) The network determines a SS or SSs needs to be detected by the UE according to a service of a buffer (a good compromise may be achieved between the service experience and the power consumption).

When the UE is changed from a state of not receiving a PDCCH (opportunity for Discontinuous Reception (DRX)) to a state of receiving a PDCCH (on duration), the network may indicate a SS or SSs to the UE for use (i.e., the specific SSs to be activated).

Within the on duration, if data is completely transmitted, the network may deactivate all SSs through the DCI or the MAC CE, thereby ending the on duration in advance and entering the state of not receiving a PDCCH (the opportunity for DRX).

3) The network determines a SS or SSs needing to be detected by the UE according to different conditions of paging information (a good compromise may be achieved between the service experience and the power consumption); when the UE receives a paging message, the paging message contains an indication message of the SS(s), or the DCI scheduling paging contains the indication message of the SS(s).

Figure 3:
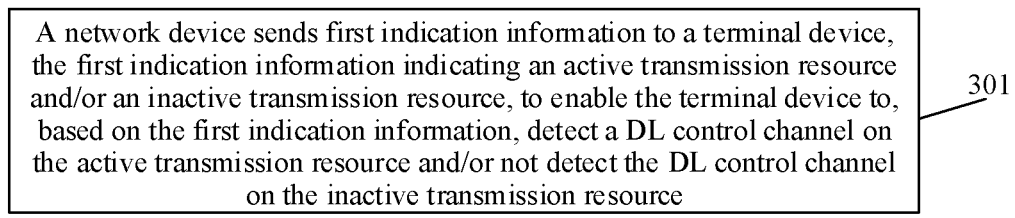
FIG. 3 is a third flowchart of a resource indication method according to an embodiment of the disclosure.

FIG. 3 is a third flowchart of a resource indication method according to an embodiment of the disclosure. As shown in FIG. 3, the resource indication method includes the following operation.

In operation 301, a network device sends first indication information to a terminal device, the first indication information indicating an active transmission resource and/or an inactive transmission resource, to enable the terminal device to, based on the first indication information, detect a DL control channel on the active transmission resource and/or not detect the DL control channel on the inactive transmission resource.

In the embodiments of the disclosure, the method may further include that:

the network device sends first configuration information to the terminal device, the first configuration information being configured to configure N transmission resources or select N transmission resources from a group of transmission resources, N≥2 and N being an integer.

In the embodiments of the disclosure, the first configuration information may be DCI, or SI, or RMSI or a MAC CE.

In the embodiments of the disclosure, the first indication information may include indication information of M1 transmission resources and/or activation indication information or deactivation indication information corresponding to the M1 transmission resources, M1 being a positive integer.

In the embodiments of the disclosure, the transmission resource may correspond to a label; and the first indication information may include indication information of labels corresponding to the M1 transmission resources respectively.

In the embodiments of the disclosure, the transmission resource may correspond to K-bit information, K being a positive integer; and the first indication information may include K-bit information corresponding to the M1 transmission resources.

In the embodiments of the disclosure, the transmission resource may correspond to K-bit information, K being a positive integer, and the activation indication information or the deactivation indication information may correspond to I-bit information; and the first indication information may include L-bit information corresponding to the M1 transmission resources respectively, K-bit information among the L-bit information represents the indication information of the transmission resource and I-bit information among the L-bit information represents the activation indication information or deactivation indication information corresponding to the transmission resource, $1 \leq I \leq L-K$ and I being an integer.

In the embodiments of the disclosure, the first indication information may include first bitmap information, the first bitmap information may be represented by M2 bits, $M2 \geq N$ and M2 being an integer, and N bits among the M2 bits may correspond to the N transmission resources one to one.

In the embodiments of the disclosure, a corresponding relationship between the N bits among the M2 bits and the N transmission resources may be determined by at least one of: a rule specified in a protocol, RRC configuration, and indication by a MAC CE.

In the embodiments of the disclosure, the method may further include that:

the network device receives, from the terminal device, an acknowledgement message indicating that the first indication information is successfully received.

In the embodiments of the disclosure, the method may further include that:

the network device receives indication information indicative of a transmission resource expected to be activated and/or indication information indicative of a transmission resource expected to be deactivated from the terminal device.

In the embodiments of the disclosure, first indication information may be DCI or a MAC CE.

In the embodiments of the disclosure, when the first indication information is the DCI, the DCI is UE-specific DCI; or, the DCI is group-common DCI.

In the embodiment of the disclosure, when the first indication information is the DCI, the DCI is scrambled by a C-RNTI; or, the DCI is scrambled by a dedicated RNTI; or, the DCI is scrambled by a specific RNTI.

In the embodiments of the disclosure, the transmission resource may be an SS, or the transmission resource may be a resource configured for the terminal device to monitor a DL control channel.

Figure 4:
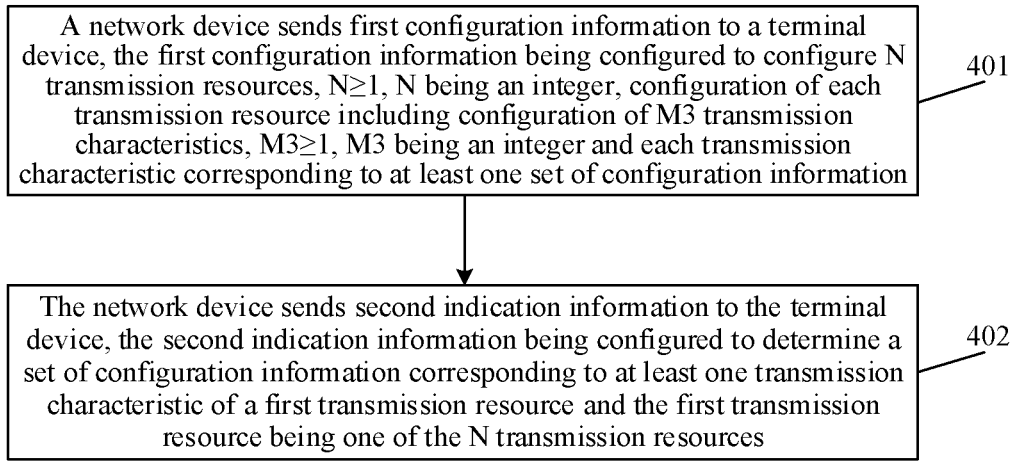
FIG. 4 is a fourth flowchart of a resource indication method according to an embodiment of the disclosure.

FIG. 4 is a fourth flowchart of a resource indication method according to an embodiment of the disclosure. As shown in FIG. 4, the resource indication method includes the following operations.

In operation 401, a network device sends first configuration information to a terminal device, the first configuration information being configured to configure N transmission resources, N being an integer, configuration of each transmission resource including configuration of M3 transmission characteristics, M3≥1, M3 being an integer and each transmission characteristic corresponding to at least one set of configuration information.

In operation 402, the network device sends second indication information to the terminal device, the second indication information being configured to determine a set of configuration information corresponding to at least one transmission characteristic of a first transmission resource and the first transmission resource being one of the N transmission resources.

In the embodiments of the disclosure, the case that the second indication information is configured to determine the set of configuration information corresponding to the at least one transmission characteristic of the first transmission resource may include the condition as below:

the second indication information includes indication information of the at least one transmission characteristic and indication information of the set of configuration information corresponding to the at least one transmission resource respectively.

In the embodiments of the disclosure, the case that the second indication information is configured to determine the set of configuration information corresponding to the at least one transmission characteristic of the first transmission resource may includes the condition as below:

the second indication information includes the indication information of the set of configuration information corresponding to the at least one transmission characteristic respectively, and the at least one transmission characteristic corresponding to the set of configuration information is determined based on a position of the set of configuration information in the second indication information.

In the embodiments of the disclosure, the method may further include that:

the network device receives, from the terminal device, an acknowledgement message indicating that the second indication information is successfully received.

In the embodiments of the disclosure, the method may further include that:

the network device receives an expected set of configuration information corresponding to the at least one transmission characteristic of the first transmission resource from the terminal device.

In the embodiments of the disclosure, first indication information may be DCI or a MAC CE.

In the embodiments of the disclosure, when the first indication information is the DCI,
  the DCI is UE-specific DCI; or,
  the DCI is group-common DCI.

In the embodiments of the disclosure, when the first indication information is the DCI,
  the DCI is scrambled by a C-RNTI; or,
  the DCI is scrambled by a dedicated RNTI; or,
  the DCI is scrambled by a specific RNTI.

In the embodiments of the disclosure, the transmission resource may be an SS, or the transmission resource may be a resource configured for the terminal device to monitor a DL control channel.

Figure 5:
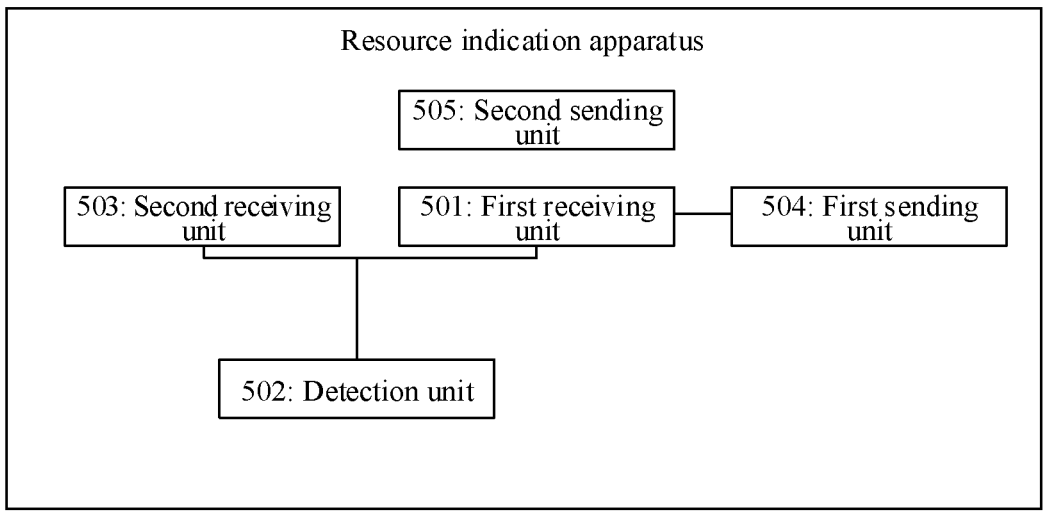
FIG. 5 is a first structure composition schematic diagram of a resource indication apparatus according to an embodiment of the disclosure.

FIG. 5 is a first structure composition schematic diagram of a resource indication apparatus according to an embodiment of the disclosure. As shown in FIG. 5, the resource indication apparatus includes a first receiving unit 501 and a detection unit 502.

The first receiving unit 501 is configured to receive first indication information from a network device, the first indication information indicating an active transmission resource and/or an inactive transmission resource.

The detection unit 502 is configured to, based on the first indication information, detect a DL control channel on the active transmission resource and/or not detect a DL control channel on the inactive transmission resource.

In the embodiments of the disclosure, the apparatus may further include a second receiving unit 503.

The second receiving unit 503 is configured to receive first configuration information from the network device, the first configuration information being configured to configure N transmission resources or select N transmission resources from a group of transmission resources, N≥2 and N being an integer.

In the embodiments of the disclosure, the first configuration information may be DCI, or SI, or RMSI or a MAC CE.

In the embodiments of the disclosure, the first indication information may include indication information of M1 transmission resources, M1 being a positive integer, and a first transmission resource may be one of the M1 transmission resources.

Responsive to that the first transmission resource is in an active state before the first indication information is received, the first transmission resource may be deactivated after the first indication information is received; and/or, responsive to that the first transmission resource is in an inactive state before the first indication information is received, the first transmission resource may be activated after the first indication information is received.

In the embodiments of the disclosure, the first indication information may include indication information of M1 transmission resources and activation indication information or deactivation indication information corresponding to the M1 transmission resources, M1 being a positive integer, and the first transmission resource may be one of the M1 transmission resources.

Responsive to that the first transmission resource corresponds to activation indication information, the first transmission resource may be activated or the first transmission resource may be kept in an active state; and/or, responsive to that the first transmission resource corresponds to deactivation indication information, the first transmission resource may be deactivated or the first transmission resource may be kept in an inactive state.

In the embodiments of the disclosure, the first indication information may include indication information of M1 transmission resources, M1 being a positive integer, and the first transmission resource may be one of the M1 transmission resources; and the first transmission resource may be activated or the first transmission resource may be kept in an active state, or the first transmission resource may be deactivated or the first transmission resource may be kept in an inactive state.

In the embodiments of the disclosure, the transmission resource may correspond to a label; and the first indication information may include indication information of labels corresponding to the M1 transmission resources respectively.

In the embodiments of the disclosure, the transmission resource may correspond to K-bit information, K being a positive integer; and the first indication information may include K-bit information corresponding to the M1 transmission resources.

In the embodiments of the disclosure, the transmission resource may correspond to K-bit information, K being a positive integer, and the activation indication information or the deactivation indication information may correspond to I-bit information; and the first indication information may include L-bit information corresponding to the M1 transmission resources respectively, K-bit information among the L-bit information represents the indication information of the transmission resource and I-bit information among the L-bit information represents the activation indication information or deactivation indication information corresponding to the transmission resource, $1 \leq I \leq L-K$ and I being an integer.

In the embodiments of the disclosure, the first indication information may include first bitmap information, the first bitmap information may be represented by M2 bits, $M2 \geq N$ and M2 being an integer, N bits among the M2 bits may correspond to the N transmission resources one to one, and the first transmission resource may be one of the N transmission resources.

When a value of a bit corresponding to the first transmission resource is a first numerical value, the first transmission resource may be activated or the first transmission resource may be kept in an active state; and/or, when a value of a bit corresponding to the first transmission resource is a second numerical value, the first transmission resource may be deactivated or the first transmission resource may be kept in an inactive state.

In the embodiments of the disclosure, a corresponding relationship between the N bits among the M2 bits and the N transmission resources may be determined by at least one of: a rule specified in a protocol, RRC configuration, and indication by a MAC CE.

In the embodiments of the disclosure, the first indication information may include first bitmap information, the first bitmap information may be represented by M2 bits, $M2 \geq N$ and M2 being an integer, N bits among the M2 bits may correspond to the N transmission resources one to one, and the first transmission resource may be one of the N transmission resources.

When a value of a bit corresponding to the first transmission resource is the first numerical value, the present active state of the first transmission resource may be changed to an inactive state or the present inactive state of the first transmission resource may be changed to an active state; and/or, when a value of a bit corresponding to the first transmission resource is the second numerical value, the present active state of the first transmission resource may be kept unchanged or the present inactive state of the first transmission resource may be kept unchanged.

In the embodiments of the disclosure, a corresponding relationship between the N bits among the M2 bits and the N transmission resources may be determined by at least one of: a rule specified in a protocol, RRC configuration, and indication by a MAC CE.

In the embodiments of the disclosure, the apparatus may further include a first sending unit 504.

The first sending unit 504 is configured to send an acknowledgement message indicating that the first indication information is successfully received to the network device.

In the embodiments of the disclosure, the apparatus may further include a second sending unit 505.

The second sending unit 505 is configured to send indication information indicative of a transmission resource expected to be activated and/or indication information indicative of a transmission resource expected to be deactivated to the network device.

In the embodiments of the disclosure, the first indication information may be DCI or a MAC CE.

In the embodiments of the disclosure, when the first indication information is the DCI,
the DCI is UE-specific DCI; or,
the DCI is group-common DCI.

In the embodiments of the disclosure, when the first indication information is the DCI,
the DCI is scrambled by a C-RNTI; or,
the DCI is scrambled by a dedicated RNTI; or,
the DCI is scrambled by a specific RNTI.

In the embodiments of the disclosure, the transmission resource may be an SS, or the transmission resource may be a resource configured for the terminal device to monitor the DL control channel.

Those skilled in the art should know that functions realized by each unit in the resource indication apparatus shown in FIG. 5 may be understood with reference to related descriptions about the resource indication method. The functions of each unit in the resource indication apparatus shown in FIG. 5 may be realized through a program running in a processor, and may also be realized through a specific logical circuit.

Figure 6:
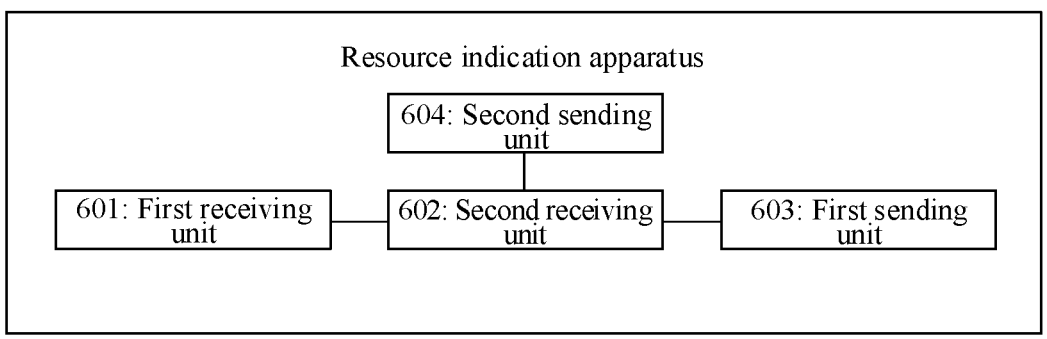
FIG. 6 is a second structure composition schematic diagram of a resource indication apparatus according to an embodiment of the disclosure.

FIG. 6 is a second structure composition schematic diagram of a resource indication apparatus according to an embodiment of the disclosure. As shown in FIG. 6, the resource indication apparatus includes a first receiving unit 601 and a second receiving unit 602.

The first receiving unit 601 is configured to receive first configuration information from a network device, the first configuration information being configured to configure N transmission resources, $N \geq 1$, N being an integer, configuration of each transmission resource including configuration of M3 transmission characteristics, $M3 \geq 1$, M3 being an integer and each transmission characteristic corresponding to at least one set of configuration information.

The second receiving unit 602 is configured to receive second indication information from the network device, the second indication information being configured to determine a set of configuration information corresponding to at least one transmission characteristic of a first transmission resource and the first transmission resource being one of the N transmission resources.

In the embodiments of the disclosure, the case that the second indication information is configured to determine the set of configuration information corresponding to the at least one transmission characteristic of the first transmission resource may include the condition as below:

the second indication information includes indication information of the at least one transmission characteristic and indication information of the set of configuration information corresponding to the at least one transmission resource respectively.

In the embodiments of the disclosure, the case that the second indication information is configured to determine the set of configuration information corresponding to the at least one transmission characteristic of the first transmission resource may include the condition as below:

the second indication information includes the indication information of the set of configuration information corresponding to the at least one transmission characteristic respectively, and the at least one transmission characteristic corresponding to the set of configuration information is determined based on a position of the set of configuration information in the second indication information.

In the embodiments of the disclosure, the apparatus may further include a first sending unit 603.

The first sending unit 603 is configured to send an acknowledgement message indicating that the second indication information is successfully received to the network device.

In the embodiments of the disclosure, the apparatus may further include a second sending unit 604.

The second sending unit 604 is configured to send an expected set of configuration information corresponding to the at least one transmission characteristic of the first transmission resource to the network device.

In the embodiments of the disclosure, first indication information may be DCI or a MAC CE.

In the embodiments of the disclosure, when the first indication information may be the DCI,
the DCI is UE-specific DCI; or,
the DCI is group-common DCI.

In the embodiments of the disclosure, when the first indication information is the DCI,
the DCI is scrambled by a C-RNTI; or,
the DCI is scrambled by a dedicated RNTI; or,
the DCI is scrambled by a specific RNTI.

In the embodiments of the disclosure, the transmission resource may be an SS, or the transmission resource may be a resource configured for the terminal device to monitor a DL control channel.

Those skilled in the art should know that functions realized by each unit in the resource indication apparatus shown in FIG. 6 may be understood with reference to related descriptions about the resource indication method. The functions of each unit in the resource indication apparatus shown in FIG. 6 may be realized through a program running in a processor, and may also be realized through a specific logical circuit.

Figure 7:
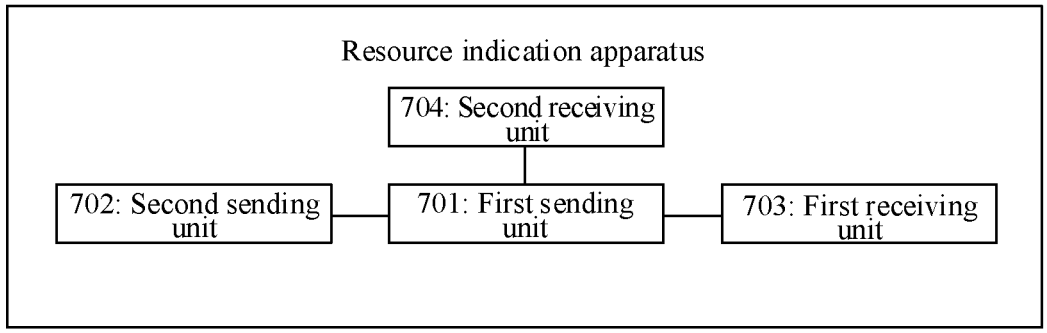
FIG. 7 is a third structure composition schematic diagram of a resource indication apparatus according to an embodiment of the disclosure.

FIG. 7 is a third structure composition schematic diagram of a resource indication apparatus according to an embodiment of the disclosure. As shown in FIG. 7, the resource indication apparatus includes a first sending unit 701.

The first sending unit 701 is configured to send first indication information to a terminal device, the first indication information indicating an active transmission resource and/or an inactive transmission resource, to enable the terminal device to, based on the first indication information, detect a DL control channel on the active transmission resource and/or not detect a DL control channel on the inactive transmission resource.

In the embodiments of the disclosure, the apparatus may further include a second sending unit 702.

The second sending unit 702 is configured to send first configuration information to the terminal device, the first configuration information being configured to configure N transmission resources or select N transmission resources from a group of transmission resources, N≥2 and N being an integer.

In the embodiments of the disclosure, the first configuration information may be DCI, or SI, or RMSI or a MAC CE.

In the embodiments of the disclosure, the first indication information may include indication information of M1 transmission resources and/or activation indication information or deactivation indication information corresponding to the M1 transmission resources, M1 being a positive integer.

In the embodiments of the disclosure, the transmission resource may correspond to a label; and the first indication information may include indication information of labels corresponding to the M1 transmission resources respectively.

In the embodiments of the disclosure, the transmission resource may correspond to K-bit information, K being a positive integer; and the first indication information may include K-bit information corresponding to the M1 transmission resources.

In the embodiments of the disclosure, the transmission resource may correspond to K-bit information, K being a positive integer, and the activation indication information or the deactivation indication information may correspond to I-bit information; and the first indication information may include L-bit information corresponding to the M1 transmission resources respectively, K-bit information among the L-bit information represents the indication information of the transmission resource and I-bit information among the L-bit information represents the activation indication information or deactivation indication information corresponding to the transmission resource, $1 \leq I \leq L-K$ and I being an integer.

In the embodiments of the disclosure, the first indication information may include first bitmap information, the first bitmap information may be represented by M2 bits, M2≥N and M2 being an integer, and N bits among the M2 bits may correspond to the N transmission resources one to one.

In the embodiments of the disclosure, a corresponding relationship between the N bits among the M2 bits and the N transmission resources may be determined by at least one of: a rule specified in a protocol, RRC configuration, and indication by a MAC CE.

In the embodiments of the disclosure, the apparatus may further include a first receiving unit 703.

The first receiving unit 703 is configured to receive, from the terminal device, an acknowledgement message indicating that the first indication information is successfully received.

In the embodiments of the disclosure, the apparatus may further include a second receiving unit 704.

The second receiving unit 704 is configured to receive indication information indicative of a transmission resource expected to be activated and/or indication information indicative of a transmission resource expected to be deactivated from the terminal device.

In the embodiments of the disclosure, the first indication information may be DCI or a MAC CE.

In the embodiments of the disclosure, when the first indication information is the DCI,
the DCI is UE-specific DCI; or,
the DCI is group-common DCI.

In the embodiments of the disclosure, when the first indication information is the DCI,
the DCI is scrambled by a C-RNTI; or,
the DCI is scrambled by a dedicated RNTI; or,
the DCI is scrambled by a specific RNTI.

In the embodiments of the disclosure, the transmission resource may be an SS, or the transmission resource may be a resource configured for the terminal device to monitor the DL control channel.

Those skilled in the art should know that functions realized by each unit in the resource indication apparatus shown in FIG. 7 may be understood with reference to related descriptions about the resource indication method. The functions of each unit in the resource indication apparatus shown in FIG. 7 may be realized through a program running in a processor, and may also be realized through a specific logical circuit.

Figure 8:
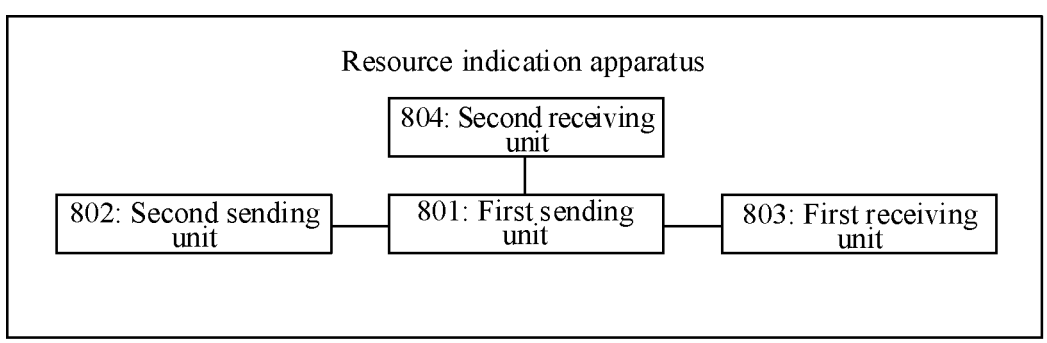
FIG. 8 is a fourth structure composition schematic diagram of a resource indication apparatus according to an embodiment of the disclosure.

FIG. 8 is a fourth structure composition schematic diagram of a resource indication apparatus according to an embodiment of the disclosure. As shown in FIG. 8, the resource indication apparatus includes a first sending unit 801 and a second sending unit 802.

The first sending unit 801 is configured to send first configuration information to a terminal device, the first configuration information being configured to configure N transmission resources, N≥1, N being an integer, configuration of each transmission resource including configuration of M3 transmission characteristics, M3≥1, M3 being an integer and each transmission characteristic corresponding to at least one set of configuration information.

The second sending unit 802 is configured to send second indication information to the terminal device, the second indication information being configured to determine a set of configuration information corresponding to at least one transmission characteristic of a first transmission resource and the first transmission resource being one of the N transmission resources.

In the embodiments of the disclosure, the case that the second indication information is configured to determine the set of configuration information corresponding to the at least one transmission characteristic of the first transmission resource may include the condition as below:

the second indication information includes indication information of the at least one transmission characteristic and indication information of the set of configuration information corresponding to the at least one transmission resource respectively.

In the embodiments of the disclosure, the case that the second indication information is configured to determine the set of configuration information corresponding to the at least one transmission characteristic of the first transmission resource may include the condition as below:

the second indication information includes the indication information of the set of configuration information corresponding to the at least one transmission characteristic respectively, and a transmission characteristic corresponding to a set of configuration information is determined based on a position of the set of configuration information in the second indication information.

In the embodiments of the disclosure, the apparatus may further include a first receiving unit 803.

The first receiving unit 803 is configured to receive, from the terminal device, an acknowledgement message indicating that the second indication information is successfully received.

In the embodiments of the disclosure, the apparatus may further include a second receiving unit 804.

The second receiving unit 804 is configured to receive an expected set of configuration information corresponding to the at least one transmission characteristic of the first transmission resource from the terminal device.

In the embodiments of the disclosure, first indication information may be DCI or a MAC CE.

In the embodiments of the disclosure, when the first indication information is the DCI, the DCI is UE-specific DCI; or, the DCI is group-common DCI.

In the embodiments of the disclosure, when the first indication information is the DCI, the DCI is scrambled by a C-RNTI; or, the DCI is scrambled by a dedicated RNTI; or, the DCI is scrambled by a specific RNTI.

In the embodiments of the disclosure, the transmission resource may be an SS, or the transmission resource may be a resource configured for the terminal device to monitor the DL control channel.

Those skilled in the art should know that functions realized by each unit in the resource indication apparatus shown in FIG. 8 may be understood with reference to related descriptions about the resource indication method. The functions of each unit in the resource indication apparatus shown in FIG. 8 may be realized through a program running in a processor, and may also be realized through a specific logical circuit.

When being implemented in form of software functional module and sold or used as an independent product, the resource indication apparatus of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read Only Memory (ROM), a magnetic disk or an optical disk. Therefore, the embodiments of the disclosure are not limited to any specific hardware and software combination.

Correspondingly, the embodiments of the disclosure also provide a computer storage medium, in which computer-executable instructions are stored, the computer-executable instructions being executed by a processor to implement the resource indication methods of the embodiments of the disclosure.

Figure 9:
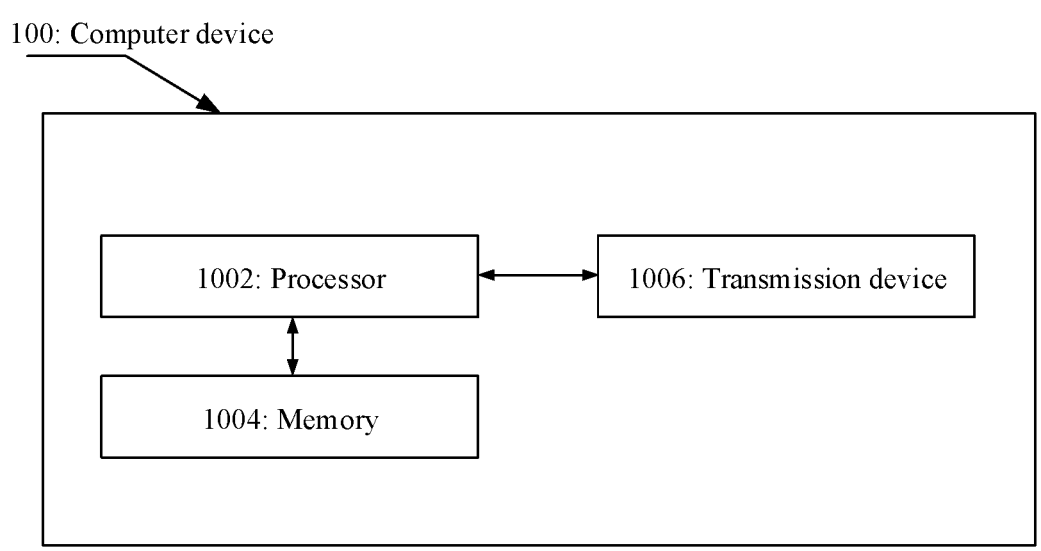
FIG. 9 is a structure composition diagram of a computer device according to an embodiment of the disclosure.

FIG. 9 is a structure diagram of a computer device according to an embodiment of the disclosure. The computer device may be UE or may also be a network device. As shown in FIG. 9, the computer device 100 may include one or more (only one is illustrated in the figure) processors 1002 (the processor 1002 may include, but not limited to, a processing device such as a Micro Controller Unit (MCU) or a Field Programmable Gate Array (FPGA)), a memory 1004 configured to store data and a transmission device 1006 configured for a communication function. Those of ordinary skill in the art should know that the structure shown in FIG. 9 is only schematic and not intended to limit the structure of the electronic device. For example, the computer device 100 may further include components more or fewer than the components shown in FIG. 9 or has a configuration different from that shown in FIG. 9.

The memory 1004 may be configured to store a software program of application software and a module, for example, a program instruction/module corresponding to a method in the embodiments of the disclosure. The processor 1002 can run the software program and module stored in the memory 1004, thereby executing various functional applications and data processing, namely implementing the abovementioned methods. The memory 1004 may include a high-speed random access memory and may also include a nonvolatile memory, for example, one or more magnetic storage devices, flash memories or other nonvolatile solid-state memories. In some examples, the memory 1004 may further include a memory arranged remotely relative to the processor 1002 and the remote memory may be connected to the computer device 100 through a network. An example of the network includes, but not limited to, the Internet, an intranet, a local area network, a mobile communication network and a combination thereof.

The transmission device 1006 is configured to receive or send data through a network. A specific example of the network may include a wireless network provided by a communication provider of the computer device 100. In an example, the transmission device 1006 includes a Network Interface Controller (NIC), which may be connected with another network device through a base station, thereby communicating with the Internet. In an example, the transmission device 1006 may be a Radio Frequency (RF) module, configured to communicate with the Internet in a wireless manner.

In the technical solutions of the embodiments of the disclosure, 1) the terminal device may receive the first indication information from the network device, the first indication information indicating the active transmission resource and/or the inactive transmission resource, and the terminal device may detect the DL control channel on the active transmission resource and/or may not detect the DL control channel on the inactive transmission resource based on the first indication information; 2) The terminal device may receive the first configuration information from the network device, the first configuration information being configured to configure the N transmission resources, N≥1, being an integer, configuration of each transmission resource including configuration of the M3 transmission characteristics, M3≥1, M3 being an integer and each transmission characteristic corresponding to the at least one set of configuration information, and the terminal device may receive the second indication information from the network device, the second indication information being configured to determine the set of configuration information corresponding to the at least one transmission characteristic of the first transmission resource and the first transmission resource being one of the N transmission resources. With adoption of the technical solutions of the embodiments of the disclosure, a more flexible DL control channel transmission mechanism is introduced, namely a network side can dynamically indicate a transmission resource configured to transmit a DL control channel, so that latency is reduced, meanwhile, the flexibility is improved and the power consumption of UE is lowered.

The technical solutions recorded in the embodiments of the disclosure may be freely combined without conflicts.

In some embodiments provided by the disclosure, it is to be understood that the disclosed method and intelligent device may be implemented in another manner. The apparatus embodiments described above are only schematic, and for example, division of the units is only logic function division, and other division manners may be adopted during practical implementation. In an example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the apparatus or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments.

In addition, each functional unit in each embodiment of the disclosure may be integrated into a second processing unit, each unit may also serve as an independent unit and two or more than two units may also be integrated into a unit. The integrated unit may be implemented in a hardware form and may also be implemented in form of hardware and software functional unit.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure.

The invention claimed is:

1. A method for resource indication, comprising:
   receiving, by a terminal device, first configuration information from a network device, the first configuration information being configured to configure N transmission resources, N≥2 and N being an integer, wherein the first configuration information is radio resource control (RRC) signaling,
   receiving, by the terminal device, first indication information from the network device, wherein the first indication information is downlink control information (DCI); and
   performing at least one of following operations:
      in case of the first indication information indicating a transmission resource configured for monitoring a physical downlink control channel (PDCCH), monitoring, by the terminal device, the PDCCH on the transmission resource indicated by the first indication information; or, in case of the first indication information indicating a transmission resource not configured for monitoring a PDCCH, not monitoring the PDCCH on the transmission resource indicated by the first indication information,
   wherein the first indication information comprises indication information of M1 transmission resources, M1 being a positive integer and is larger than 1, and a first transmission resource is one of the M1 transmission resources;
   wherein the method further comprises: performing, by the terminal device, at least one of following operations:
      in case of the first transmission resource being the transmission resource configured for monitoring the PDCCH before the first indication information is received, not monitoring the PDCCH on the first transmission resource after the first indication information is received; or, in case of the first transmission resource being not the transmission resource configured for monitoring the PDCCH before the first indication information is received, monitoring the PDCCH on the first transmission resource after the first indication information is received,
   wherein the transmission resource is a search space.

2. The method of claim 1, wherein the transmission resource corresponds to an index; and
   the first indication information comprises indication information of indexes corresponding to M1 transmission resources respectively.

3. An apparatus for resource indication, comprising:
   a transmission device, configured to:
      receive first configuration information from a network device, the first configuration information being configured to configure N transmission resources, N≥2 and N being an integer, wherein the first configuration information is radio resource control (RRC) signaling, and receive first indication information from the network device, wherein the first indication information is downlink control information (DCI); and a processor, connected to the transmission device and configured to perform at least one of following operations:

in case of the first indication information indicating a transmission resource configured for monitoring a physical downlink control channel (PDCCH), monitoring the PDCCH on the transmission resource indicated by the first indication information; or, in case of the first indication information indicating a transmission resource not configured for monitoring a PDCCH, not monitoring the PDCCH on the transmission resource indicated by the first indication information, wherein the first indication information comprises indication information of M1 transmission resources, M1 being a positive integer and is larger than 1, and a first transmission resource is one of the M1 transmission resources;

wherein the processor is further configured to perform at least one of following operations:

in case of the first transmission resource being the transmission resource configured for monitoring the PDCCH before the first indication information is received, not monitoring the PDCCH on the first transmission resource after the first indication information is received; or, in case of the first transmission resource being not the transmission resource configured for monitoring the PDCCH before the first indication information is received, monitoring the PDCCH on the first transmission resource after the first indication information is received, wherein the transmission resource is a search space.

4. The apparatus of claim 3, wherein the transmission device is further configured to:
send an acknowledgement message indicating that the first indication information is successfully received to the network device.

5. The apparatus of claim 3, wherein the transmission device is further configured to:
send indication information indicative of a transmission resource expected to be activated, or indication information indicative of a transmission resource expected to be deactivated, or indication information indicative of both a transmission resource expected to be activated and a transmission resource expected to be deactivated to the network device.

6. The apparatus of claim 3, wherein the DCI is group-common DCI.

7. The apparatus of claim 6, wherein
the DCI is scrambled by a dedicated radio network temporary identifier (RNTI).

8. The method of claim 1, wherein N=2, or, M1=2, or, N=2 and M1=2.

9. The method of claim 1, wherein the DCI is group-common DCI.

10. The method of claim 1, wherein the DCI is scrambled by a dedicated radio network temporary identifier (RNTI).

11. A method for resource indication, comprising:
sending, by a network device, first configuration information to a terminal device, the first configuration information being configured to configure N transmission resources, N≥2 and N being an integer, wherein the first configuration information is radio resource control (RRC) signaling; and sending, by the network device, first indication information to the terminal device, wherein the first indication information is downlink control information (DCI);

wherein the first indication information indicates at least one of following resources: a transmission resource configured for monitoring a physical downlink control channel (PDCCH), or, a transmission resource not configured for monitoring a PDCCH, wherein the first indication information comprises indication information of M1 transmission resources, M1 being a positive integer and is larger than 1, and a first transmission resource is one of the M1 transmission resources;

wherein the first indication information indicates at least one of following operations:

in case of the first transmission resource being the transmission resource configured for monitoring the PDCCH before the first indication information is received, indicating the terminal device to not monitor the PDCCH on the first transmission resource after receiving the first indication information; or, in case of the first transmission resource being not the transmission resource configured for monitoring the PDCCH before the first indication information is received, indicating the terminal device to monitor the PDCCH on the first transmission resource after receiving the first indication information, wherein the transmission resource is a search space.

12. The method of claim 11, wherein the DCI is group-common DCI.

13. The method of claim 11, wherein the DCI is scrambled by a dedicated radio network temporary identifier (RNTI).

14. The method of claim 11, wherein the transmission resource corresponds to an index; and
the first indication information comprises indication information of indexes corresponding to M1 transmission resources respectively.

15. The method of claim 10, wherein N=2, or, M1=2, or, N=2 and M1=2.

16. An apparatus for resource indication, comprising:
a processor; and
a transmission device, connected to the processor,
wherein the transmission device is configured to:
send first configuration information to a terminal device, the first configuration information being configured to configure N transmission resources, N≥2 and N being an integer, wherein the first configuration information is radio resource control (RRC) signaling; and
send first indication information to the terminal device, wherein the first indication information is downlink control information (DCI);

wherein the first indication information indicates at least one of following resources: a transmission resource configured for monitoring a physical downlink control channel (PDCCH), or, a transmission resource not configured for monitoring a PDCCH, wherein the first indication information comprises indication information of M1 transmission resources, M1 being a positive integer and is larger than 1, and a first transmission resource is one of the M1 transmission resources;

wherein the first indication information indicates at least one of following operations:

in case of the first transmission resource being the transmission resource configured for monitoring the PDCCH before the first indication information is received, indicating the terminal device to not monitor the PDCCH on the first transmission resource after receiving the first indication information; or, in case of the first transmission resource being not the transmission resource configured for monitoring the PDCCH before the first indication information is received, indicating the terminal device to monitor the PDCCH on the first transmission resource after receiving the first indication information, wherein the transmission resource is a search space.

17. The apparatus of claim 16, wherein the DCI is group-common DCI.

18. The apparatus of claim 16, wherein the DCI is scrambled by a dedicated radio network temporary identifier (RNTI).

19. The apparatus of claim 16, wherein N=2, or, M1=2, or, N=2 and M1=2.

20. The apparatus of claim 16, wherein the transmission resource corresponds to an index; and the first indication information comprises indication information of indexes corresponding to M1 transmission resources respectively.

* * * * *